(Model.)
N. S. KEITH.
MAGNETO ELECTRIC MACHINE.
No. 245,922. Patented Aug. 16, 1881.
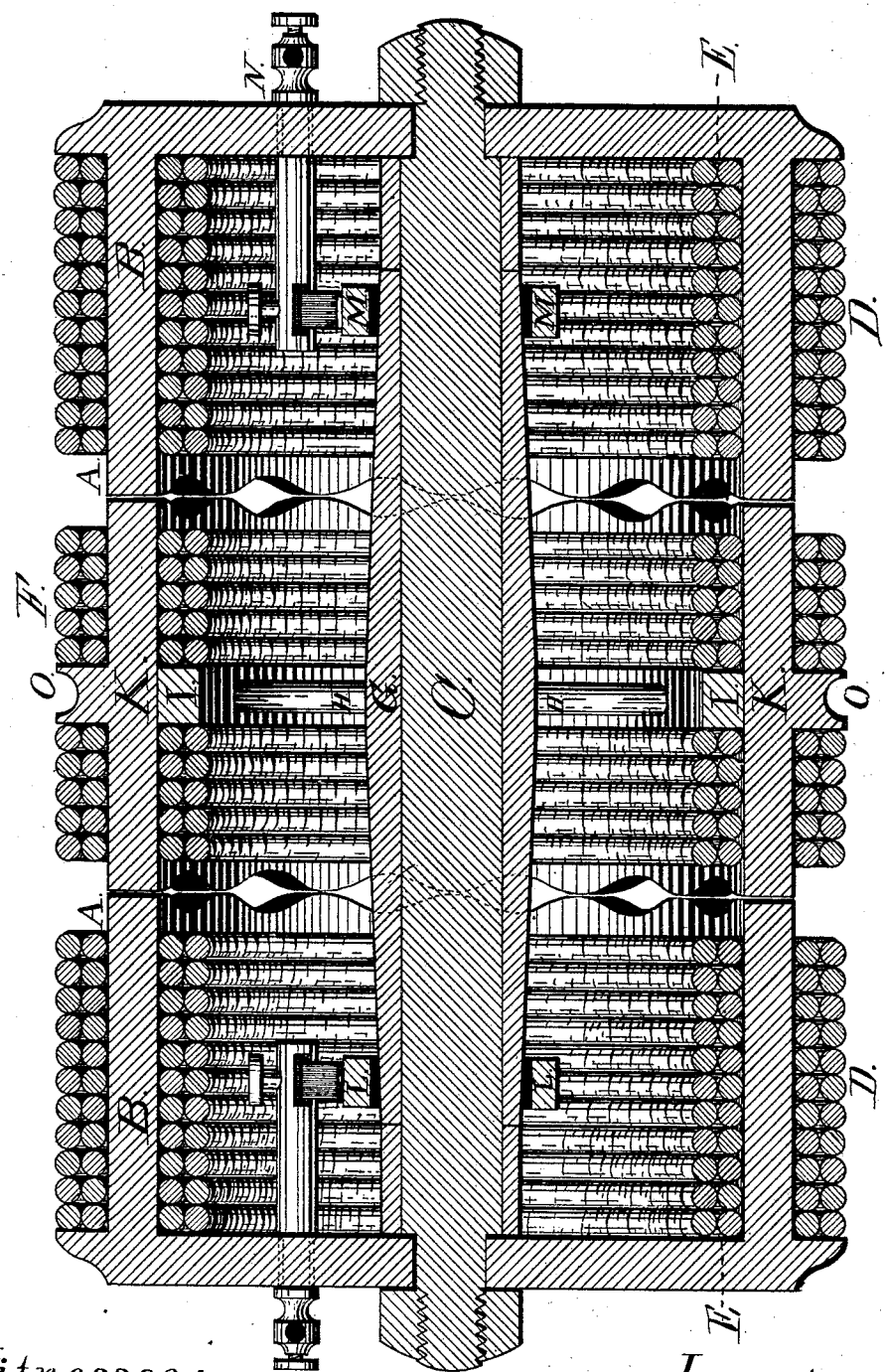

UNITED STATES PATENT OFFICE.

NATHANIEL S. KEITH, OF NEW YORK, N. Y., ASSIGNOR TO THE FULLER ELECTRICAL COMPANY, OF SAME PLACE.

MAGNETO-ELECTRIC MACHINE.

SPECIFICATION forming part of Letters Patent No. 245,922, dated August 16, 1881.

Application filed May 4, 1880. (Model.)

*To all whom it may concern:*

Be it known that I, NATHANIEL SHEPARD KEITH, of the city, county, and State of New York, have invented a new and useful Improvement in Magneto-Electric Machines; and I do hereby declare that the following is a full and exact description of the same, sufficient to enable others skilled in the art to make and use the same, reference being made to the accompanying drawing.

The machines belongs to the class which is used to produce currents of electricity by induction when rotated by the application of mechanical power.

The drawing shows one-half of the machine produced by making a longitudinal section parallel with its axis.

A A represent two hollow cylindrical electro-magnet poles, the cores B B of which are of soft iron or equivalent material. These cores are hollow cylinders, closed, each at one end, either wholly or partially, and have their edges serrated, as shown. They are magnetically connected by the turned iron shaft C. The insulated copper-wire coils D D are wound about their outer circumference, and the coils E E are wound and placed within their inner circumference. These coils are so connected electrically that when a current of electricity is passed through them the serrated edges of each cylinder become respectively either north or south poles of an electro-magnet. Thus it becomes the field-of-force magnet, which induces magnetism in the core of and electricity in the coils of the armature F.

The armature is constructed as follows: The hub G is made so as to turn truly on the shaft C. On the hub are securely attached a sufficient number of radial arms, H H, extending to and carrying the ring I. Securely fastened to this ring is the iron drum K, which is correspondingly serrated like the field-of-force magnet-poles, but at the edges of both its ends. It has inner and outer coils of insulated copper wire, which are electrically connected, and has one end of that circuit electrically connected with the ring L and the other end with ring M. These rings are fastened to the hub G, but are electrically insulated therefrom. They act as poles where the electricity generated in the coils of the armature is collected and carried to the desired places through the brushes, holders, and binding-posts N N and their external electrical connections. On the outer circumference of the armature is the groove O, provided to receive an endless cord or belt used to rotate the armature.

The operation of the machine is as follows: The coils of the field-of-force magnets are electrically connected with a source of electricity which induces magnetism in its cores. These, in course, induce magnetism in the core of the armature, and when that is rotated successive waves of electricity having to-and-fro direction are generated in its coils as the apices of the serrations approach and recede. This is due to the changes so brought about in the magnetism of the armature-core.

The several coils may be connected in "series" or in "multiple arc," or may be fine or coarse or of any length, in accordance with well-known principles, depending upon the electro-motive force and quantity of electricity required.

Permanent magnets may be substituted for the field-of-force magnets.

The machine may also be used as a dynamo-electric machine—*i. e.*, one which produces its currents by "mutual accumulation"—if the circuit be made in the well-known way through a commutator having the proper number of parts arranged to turn in one direction the several to-and-fro currents.

The outer ends of the field-of-force magnet should have the proper openings for access to the brushes, collectors, or commutator.

Having described my improvement and its operation, I claim as my invention—

1. In a dynamo or magneto electric machine, an armature electro-magnet whose pole or poles are provided with serrations or corrugations transverse to the direction of motion of said pole, substantially as and for the purpose described.

2. In a dynamo or magneto electric machine, the combination of moving electro-magnets whose poles are serrated in a direction transverse to their direction of motion with field-of-force poles correspondingly serrated, substantially as and for the purpose described.

3. In a dynamo or magneto electric machine, a field-of-force magnet in the shape of a hollow cylinder, and having its polar edge serrated in lines transverse to the direction of motion of the armature-poles, in combination with armatures consisting of a hollow cylinder whose polar edge is correspondingly serrated.

4. In a magneto-electric machine, a field-of-force magnet having its poles in the shape of a hollow cylinder with the polar edges serrated, substantially as and for the purposes specified.

5. In a dynamo-electric machine, a field-of-force electro-magnet having its poles in the shape of a hollow cylinder with the polar edges serrated, with coils of insulated wire wound circumferentially around and within the cylinder, substantially as and for the purposes specified.

6. In a magneto-electric or dynamo-electric machine, an armature having a core which is a hollow cylinder of iron with its ends serrated in the direction of its circumference, and coils of insulated wire wound circumferentially around and within the cylinder, substantially as described.

7. In a dynamo or magneto electric machine, a field-of-force electro-magnet whose core consists of two hollow cylinders provided with closed ends joined by a central or axial bar, substantially as described.

8. In a dynamo or magneto electric machine, a field-of-force electro-magnet whose core consists of two hollow cylinders provided with closed ends joined by a central or axial bar of magnetic material, substantially as described.

9. In a dynamo or magneto electric machine, a field-of-force electro-magnet whose core consists of two hollow cylinders provided with closed ends joined by a cylindrical rod constituting the shaft upon which the armature rotates.

10. In a dynamo or magneto electric machine, a field-of-force electro-magnet consisting of two hollow cylinders with serrated edges and closed ends, in combination with a central rod or shaft and a hollow cylindrical armature-magnet rotating upon said shaft, substantially as described.

11. The combination of the shaft C, joining field-of-force magnets, hub G, and armature carried by said hub.

12. The combination of the shaft C, joining the closed ends of the cylindrical field-of-force magnets, the hub G, and the cylindrical armature-magnet placed between the open ends of the field-of-force cylinders.

Signed by me this 23d day of April, 1880.

N. S. KEITH.

Witnesses:
HERMAN L. R. EMMET,
GO. H. HINNAN.